Patented Nov. 30, 1937

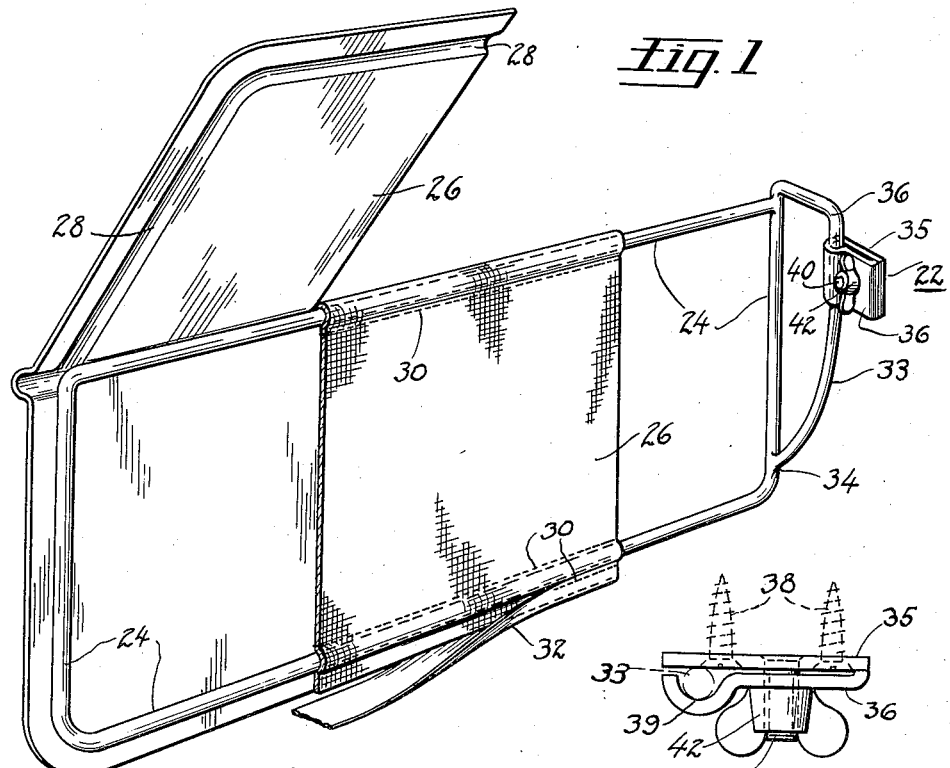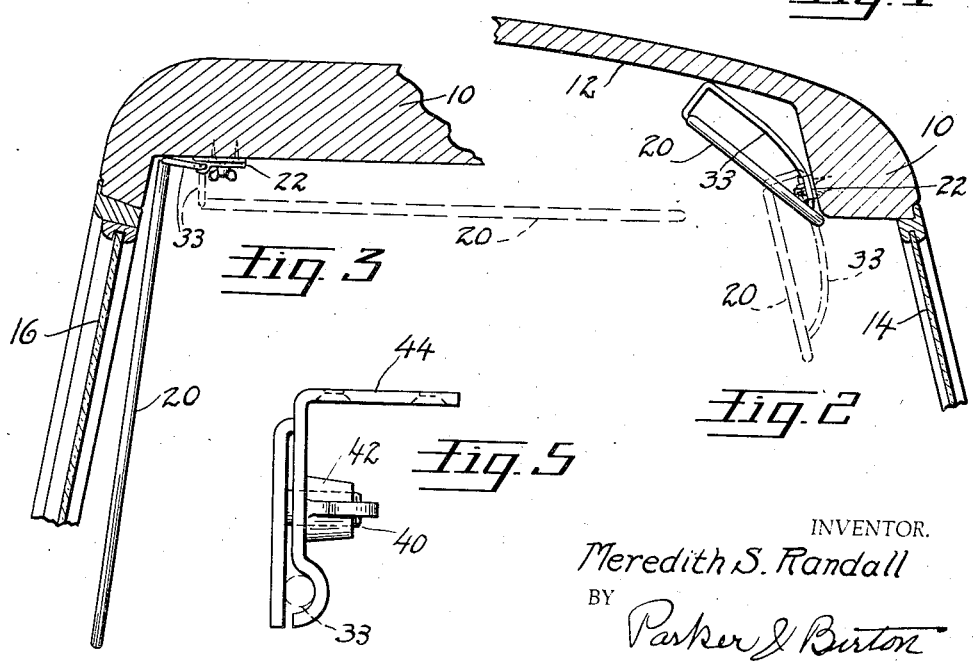

2,100,872

UNITED STATES PATENT OFFICE 2,100,872

VISOR CONSTRUCTION

Meredith S. Randall, Detroit, Mich., assignor to Woodall Industries Incorporated, Detroit, Mich., a corporation of Michigan Application October 12, 1934, Serial No. 748,049

12 Claims. (Cl. 296—97)

My invention relates to improvements in automobile body construction and particularly to improvements therein relating to and embodying a novel sun visor and mounting therefor, whereby the visor may be moved from a position of non-use to a position overlying the windshield or a position overlying a side window adjacent to the windshield.

In modern automobile body construction a low header surmounts the windshield and the roof extends rearwardly from the header. A relatively narrow corner pillar forms a support for the windshield and for a side door within which a slidable window pane is mounted. It is desirable to have a visor which will function as a sun visor either in a position overlying the windshield or in a position overlying the side window pane adjacent to the windshield to keep the sun from striking the eyes of the driver on such side of the vehicle.

My improved visor is so constructed and mounted that it will occupy a position of non-use arranged angularly between the header and the roof rearwardly of the header. It is slidably movable downwardly to various adjusted positions overlying the windshield. It is swingable about its support to a position overlying the side window pane. It is simple, inexpensive, and of rugged construction and readily adjustable.

Other objects, advantages and meritorious features of my invention will more fully appear from the following description, appended claims, and accompanying drawing, wherein:

Figure 1 is a perspective of a visor partly broken away embodying my invention,

Fig. 2 is a vertical sectional view through an automobile body structure showing the visor in position, Fig. 3 is a horizontal sectional view through an automobile body structure showing the visor in position, Fig. 4 is a view of the bracket which supports the visor, and Fig. 5 is an elevation of a modified form of bracket used to support the visor.

The type of inside visor generally used in automobiles for this purpose is one which is mounted on the header and swings downwardly about a pivot to various adjusted angular positions overlying the front windshield 14 and which is swingable through some type of universal joint within the mounting or support to a position overlying the window pane 16 of the side window. These movements are provided for through the employment of a support which is capable of being so adjusted. Such a type of support is likely to be complicated and because of the number of parts is expensive. The purpose of my improvement is to provide a visor which will function to serve the purposes set forth but which employs a very simple support and which is in itself very simple.

In modern closed body construction the header which surmounts the windshield is relatively low in height and it is not possible to mount a visor thereon and withdraw the same for juxtaposition thereagainst when not in use and to provide a visor which will have sufficient width to form the proper sun shield. I have therefore provided a visor and support structure so formed that when the visor is not in use it may be arranged to extend rearwardly angularly upwardly from the lower edge of the header as shown in Fig. 2 and be supported in that position. When the visor is in use as a shield for the windshield it is slidably moved downwardly to a position depending below the header as shown in dotted outline in Fig. 2.

The visor may be of the character generally shown in the Patent No. 1,963,393. This comprises a frame 24 which is of a generally rectangular shape and which may be made of wire bent to the desired shape. This frame is covered with suitable material 26 in the form of a panel which closes the aperture thereof and which forms the visor itself. As shown the material 26 is in the form of a sheet grooved as at 28 and folded sandwich fashion over the frame as shown, and stitched thereto as at 30. A binding 32 may be secured thereabout as indicated. In Fig. 1 the material of the panel is shown as folded back in one place and the frame is uncovered in one place to show the structure.

The visor is provided with a supporting arm 33 which is here shown as being a continuation of the wire frame 24 or as welded thereto so as to form a loop at one end of the frame which is offset laterally from the frame and which includes the arm 33 that extends substantially the width of the visor from a point 34 adjacent the lower edge thereof angularly to a point 36 spaced from the upper edge of the visor. The particular angular shape of this arm serves a definite purpose in permitting the visor to be positioned as shown in solid line in Fig. 2. While this supporting arm is shown in Fig. 1 as a continuation of the frame itself it might be otherwise formed to serve the purpose.

The bracket 22 is shown in Figs. 1, 2, and 4 as a simple type of structure comprising a pair of plates 35 and 36. Plate 35 may be held by screws 38 to the header as shown in Figs. 2 and 3. It carries a threaded stud 40. The plate 36 is secured in juxtaposition over the plate 35 and upon the stud 40 by the single nut 42. This plate 36 is provided with a recess 39 adapted to embrace the supporting arm 33 as shown in Figs. 1 and 4. Tightening of the single nut causes the plates to grip the arm and support the visor at adjusted positions.

It is apparent that the arm may be moved slidably, upon release of the single nut, to any adjusted position intermediate the positions shown in Fig. 2 in dotted outline and in solid line. In the position shown in dotted line the visor is in the lowermost position overlying the windshield. It might be moved only part way down to such position if that adjustment were desirable. In the position shown in solid line the visor has been moved to a place of non-use arranged angularly rearwardly with respect to the header 10.

If it is desired to use the visor in a position with respect to the side window 16 it may be swung pivotally about the arm 33 as a pivot to the position shown in solid line in Fig. 3.

In Fig. 5 I have shown a form of bracket which differs slightly from the one shown in Fig. 4 as it has an angular extension 44 which carries the portions that secure the bracket to the header. With this type of bracket the visor when arranged in the solid line position shown in Fig. 3 will be swung further outwardly than is feasible with the type of bracket shown in Fig. 4.

What I claim:

1. In an automobile body having a front windshield, a header surmounting the windshield and a side window arranged rearwardly of the windshield, a visor having a supporting arm extending substantially across the width thereof, a supporting bracket carried by the header coupled with said arm permitting slidable adjustment of the arm with respect to said bracket to move the visor from a position of non-use overlying the header and extending rearwardly upwardly angularly from the lower edge of the header to a position of use depending below the header overlying the windshield, said bracket engaging the arm adjacent to the lower edge of the visor when the visor is in the position of non-use and engaging the arm adjacent to the upper edge of the visor when the visor is in the position of use, said bracket so coupled with the arm as to permit rotatable swingable movement of the visor into a position extending rearwardly from the windshield overlying said side window.

2. In an automobile body having a front windshield, a header surmounting the windshield and a side window arranged rearwardly of the windshield, a visor having a supporting arm at one end extending substantially the width of the visor, a supporting bracket carried by the header coupled with said arm to permit slidable adjustment of the arm with respect to the bracket from a position of engagement of the bracket with the lower end of the arm to move the visor from a position extending rearwardly and upwardly of the header to a position depending therebelow with the bracket engaging the upper end of the arm.

3. In an automobile body having a front windshield, a header surmounting the windshield and a side window arranged rearwardly of the windshield, a visor having at one end an arm laterally offset and extending substantially the width thereof, a bracket carried by the header coupled with said arm, said arm being slidably adjustable throughout substantially its entire length to support the visor extending upwardly from the bracket above the windshield or depending below the bracket overlying the windshield, said visor being rotatable about said arm as a pivot within said bracket to overlie said side window.

4. A visor having a substantially oblong frame, a panel carried thereby, said frame having at one end an arm extending angularly from a point adjacent to the lower edge of the frame to a point spaced laterally from the upper edge of the frame offset from the plane of the frame, a support engaging said arm for swingable movement of the visor upon said arm about said support and for slidable movement of the arm lengthwise with respect to the support, said arm being curved so as to cause the visor to travel in an arcuate path in its slidable movement.

5. A visor comprising a substantially rectangular wire frame carrying a panel and having at one end a supporting arm extended transversely of and laterally offset from the frame of the visor and being rigid with said visor frame and a supporting bracket slidably and rotatably engaging said arm.

6. A visor comprising a substantially rectangular wire frame carrying a panel and having at one end a supporting arm extended transversely thereof and laterally offset from the plane of the visor and a supporting bracket slidably and rotatably engaging said arm, said arm extending angularly and in a gradual curve from a position adjacent to the lower edge of the visor to a position in spaced relationship with respect to the upper edge thereof.

7. A visor having a supporting arm in fixed relation thereto and extending from a point adjacent to its lower edge angularly upwardly over its front face in a plane normal thereto to a point spaced forwardly from its upper edge and a bracket having a clamp engaging said arm through which the arm is slidably adjustable lengthwise and rotatably adjustable.

8. A visor assembly comprising a visor panel provided with a supporting frame extending transversely thereof from a point adjacent to the lower edge of the panel angularly upwardly offset and spaced laterally from the plane of the panel to a point adjacent to the upper edge of the panel said transversely extending supporting frame being rigid with the visor panel, and a clamp engaging said arm through which the arm is slidably adjustable lengthwise to permit the panel to project upwardly from the clamp or to depend below the clamp.

9. In an automobile body having a front windshield, a header surmounting the windshield window and a side window arranged rearwardly of the windshield, and a visor arranged to cut off the glare of light entering either of said windows, said visor having a part extending transversely thereof, said header provided with a bracket engaging said part permitting slidable movement of the part through the bracket from a position engaging the lower end of the part with the visor extending upwardly rearwardly angularly from the lower edge of the header to a position engaging the upper end of the part with the visor depending below the header and rearwardly of the windshield.

10. In an automobile body having a front windshield, a header surmounting the windshield and a side window arranged rearwardly of the windshield, a visor having a width greater than the width of the header, said visor having a part extending substantially across the width thereof, said header provided with a support engaging said part and permitting slidable movement of the part through the support from a position of engagement with the part adjacent to its lower end with the visor extending rearwardly angularly upwardly from the lower edge of the header and to a position of engagement with the part adjacent to its upper end with the visor depending below said header overlying the windshield, said part being curved for a portion of its extent so as to cause the visor to travel in an arcuate path as it is moved upwardly above the lower edge of said header.

11. A visor construction comprising a pair of spaced longitudinally extending wire members and a pair of spaced transversely extending wire members joining the longitudinal members and forming a closed rectangular frame for the visor, an additional wire member extending generally parallel to but in spaced relationship to one of said transversely extending wire members and in a plane perpendicular to the plane of the rectangular frame, said additional wire member having its opposite ends bent toward said frame and joined integrally therewith, and a supporting bracket having means for slidably and pivotally engaging said additional wire member whereby said visor may be bodily shifted by reason of the slidable connection with said bracket and be turned from side to side by reason of its pivotal connection with said bracket.

12. In an automobile body having a top, a front windshield window, a side window arranged at substantially right angles to said front windshield, and a header surmounting the windshield and forming a portion of the top, a visor supporting bracket attached to said header in the corner formed by the front windshield window and the side window, a visor of generally rectangular shape having a rod-shaped supporting element fixed to the rectangular visor adjacent one end thereof and extending laterally from the plane of the visor toward the header and the windshield, said rod-shaped supporting element being slidably and pivotally engaged by said bracket whereby said visor is adapted to be bodily shifted in a substantially vertical plane relative to the header and the front windshield and to be turned from a position substantially parallel with the front windshield window to a position substantially parallel with the side window.

MEREDITH S. RANDALL.